United States Patent
Goldwasser

(10) Patent No.: US 10,039,242 B1
(45) Date of Patent: Aug. 7, 2018

(54) AUTOMATED IRRIGATION GATE SYSTEM AND METHOD FOR REGULATING WATER IN AN IRRIGATION CHANNEL AND CONSERVING WATER IN AN AGRICULTURAL REGION

(71) Applicant: Jack Martin Goldwasser, Grants Pass, OR (US)

(72) Inventor: Jack Martin Goldwasser, Grants Pass, OR (US)

(*) Notice: Subject to any disclaimer, the term of this patent is extended or adjusted under 35 U.S.C. 154(b) by 0 days.

(21) Appl. No.: 15/396,054

(22) Filed: Dec. 30, 2016

Related U.S. Application Data

(60) Provisional application No. 62/375,473, filed on Aug. 16, 2016.

(51) Int. Cl.
| | |
|---|---|
| *E02B 13/00* | (2006.01) |
| *E02B 7/28* | (2006.01) |
| *A01G 25/16* | (2006.01) |
| *A01G 1/00* | (2006.01) |
| *H02S 99/00* | (2014.01) |
| *G05D 7/06* | (2006.01) |
| *G05B 19/048* | (2006.01) |
| *A01G 22/00* | (2018.01) |

(52) U.S. Cl.
CPC ........... *A01G 25/167* (2013.01); *A01G 1/001* (2013.01); *A01G 22/00* (2018.02); *E02B 7/28* (2013.01); *E02B 13/00* (2013.01); *G05B 19/048* (2013.01); *G05D 7/0635* (2013.01); *H02S 99/00* (2013.01); *G05B 2219/2625* (2013.01)

(58) Field of Classification Search
CPC . E02B 13/00; E02B 13/02; E02B 7/28; E02B 7/36
USPC .................................................. 405/104, 106
See application file for complete search history.

(56) References Cited

U.S. PATENT DOCUMENTS

| | | | | | |
|---|---|---|---|---|---|
| 2,835,469 | A | * | 5/1958 | Rothenberger | ......... E02B 13/02 251/147 |
| 3,114,243 | A | * | 12/1963 | Winters | .................. E02B 13/00 137/625.42 |
| 3,351,317 | A | * | 11/1967 | Rothenberger | ......... E02B 13/02 251/147 |

(Continued)

FOREIGN PATENT DOCUMENTS

JP 60261820 A * 12/1985 ............. A01G 16/00

*Primary Examiner* — Frederick L Lagman
(74) *Attorney, Agent, or Firm* — Jerry Haynes Law

(57) ABSTRACT

An automated irrigation gate system and method for regulating water levels in irrigation channels automates control of water through an irrigation channel based upon water levels, water flow rate, and ambient environmental conditions in the irrigation channel and an adjacent agricultural region. The system comprises at least one irrigation regulation device operationally attached to the irrigation channel. The irrigation regulation device regulates fluid flow through a channel opening in the irrigation channel through use of a gate. A fluid sensor monitors the level of fluid in the channel and an adjacent agricultural region. The fluid sensor also monitors the flow rate of the fluid flowing from the channel to the region. An environmental sensor monitors environmental conditions ambient to the region. A control portion comprises a processor that calculates the data to selectively displace the gate between an open position and a closed position relative to channel opening.

18 Claims, 12 Drawing Sheets

(56) References Cited

U.S. PATENT DOCUMENTS

| | | | | |
|---|---|---|---|---|
| 3,372,549 A | * | 3/1968 | French | E02B 13/02 405/92 |
| 3,952,522 A | * | 4/1976 | Shettel | E02B 13/02 251/147 |
| 3,995,435 A | * | 12/1976 | Waterston | E02B 13/00 137/527.6 |
| 4,431,338 A | * | 2/1984 | Hornabrook | E02B 13/00 405/36 |
| 4,464,079 A | * | 8/1984 | Chance | E02B 13/00 405/36 |
| 4,685,828 A | * | 8/1987 | Whittle | E02B 13/02 251/147 |
| 4,726,709 A | * | 2/1988 | Labelle | E02B 7/28 405/103 |
| 5,472,293 A | | 12/1995 | Roller | |
| 5,577,863 A | | 11/1996 | Nottle | |
| 5,667,336 A | * | 9/1997 | Zur | E02B 13/00 137/78.3 |
| 5,993,111 A | | 11/1999 | Hollowat et al. | |
| 6,109,827 A | | 8/2000 | Holloway, Jr. | |
| 7,403,840 B2 | * | 7/2008 | Moore | A01G 25/16 700/282 |
| 7,844,368 B2 | * | 11/2010 | Alexanian | A01G 25/16 239/69 |
| 8,292,542 B2 | | 10/2012 | Aughton et al. | |
| 8,602,686 B2 | | 12/2013 | Aughton et al. | |
| 2002/0066484 A1 | * | 6/2002 | Stringam | A01G 25/16 137/392 |
| 2003/0026659 A1 | * | 2/2003 | Wu | E02B 7/30 405/87 |
| 2003/0095837 A1 | | 5/2003 | Sieling | |
| 2004/0144432 A1 | * | 7/2004 | Schafer | A01G 25/16 137/624.18 |
| 2006/0002763 A1 | * | 1/2006 | Schafer | E02B 11/00 405/43 |
| 2010/0129154 A1 | * | 5/2010 | Cox | A01G 25/167 405/39 |
| 2010/0324744 A1 | * | 12/2010 | Cox | A01G 27/003 700/284 |
| 2012/0275863 A1 | | 11/2012 | Goldwasser | |
| 2015/0361630 A1 | * | 12/2015 | Appelboom | E02B 7/28 405/104 |
| 2016/0048135 A1 | | 2/2016 | Hill | |

* cited by examiner

AUTOMATED IRRIGATION GATE SYSTEM AND METHOD FOR REGULATING WATER IN AN IRRIGATION CHANNEL AND CONSERVING WATER IN AN AGRICULTURAL REGION

CROSS-REFERENCE TO RELATED APPLICATIONS

This application claims the benefits of U.S. provisional application No. 62/375,473, filed Aug. 16, 2016 and entitled AUTOMATED GATE ASSEMBLY AND METHOD FOR CONTROLLING IRRIGATION FLOODING AND WATER CONSERVATION, which provisional application is incorporated by reference herein in its entirety.

FIELD OF THE INVENTION

The present invention relates generally to an automated irrigation gate system and method for regulating water levels in an irrigation channel and conserving water in an agricultural region. More so, the present invention automates control of water through an irrigation channel based upon water levels, water flow rate, and ambient environmental conditions in the irrigation channel and an adjacent agricultural field through use of at least one automated irrigation gate system that operationally attaches to the irrigation channel to monitor the level of fluid in the channel and in an adjacent agricultural region, the flow rate of the fluid from the channel to the field, and environmental conditions ambient to the field, such that a processor calculates the data to controllably displace a gate over a channel opening between an open position and a closed position.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, irrigation is the method in which water is supplied to plants at regular intervals for agriculture. Irrigation is used to assist in the growing of agricultural crops, maintenance of landscapes, and revegetation of disturbed soils in dry areas and during periods of inadequate rainfall. In contrast, agriculture that relies only on direct rainfall is referred to as rain-fed or dry land farming.

Generally, water control gates are operable along irrigation channels. The water control gates may be of a type used along irrigation channels or may be of a type used along the sides of irrigation channels to allow water to flow into bays along the channel and extending therefrom and such gates may have local or remote control.

It is known that there have been proposed many forms of water control gates having a rigid closure member which may be hinged or lifted for allowing water flow and then closed or placed down again to stop water flow. There is a problem however that if solid material such as stones, pebbles, sticks or the like are in the gateway when the gate is shut, then the solid gate member may jam not fully shut and considerable leakage through the gate can occur. Also, the gates are not automated or remotely controlled; and thus require constant supervision to allow appropriate amounts of water through the channel and into the field.

Other proposals have involved water gates systems for irrigation. The problem with these systems is that they do not take into account water levels, flow rates, and environmental conditions when opening and closing the gates. Also, they are not automated or remotely controlled. Even though the above cited water control gates meets some of the needs of the market, an automated irrigation gate system and method for regulating water levels in an irrigation channel and an agricultural region that automates control of water through an irrigation channel based upon water levels, water flow rate, and ambient environmental conditions in the irrigation channel and an adjacent agricultural region through use of at least one automated irrigation gate system that operationally attaches to the irrigation channel to monitor fluid levels, flow rates, and environmental conditions, such that a processor may calculate the data to controllably displace a gate over a channel opening between an open position and a closed position, is still desired.

SUMMARY

Illustrative embodiments of the disclosure are generally directed to an automated irrigation gate system and method for regulating water levels in an irrigation channel and an agricultural field. The assembly is configured to automate control of water through an irrigation channel based upon water levels, water flow rate, and ambient environmental conditions in the irrigation channel and an adjacent agricultural region. The assembly comprises at least one irrigation regulation device that operationally attaches to the irrigation channel.

The irrigation regulation device is configured to regulate fluid flow through a channel opening in the irrigation channel through use of a slidably displaceable gate. A fluid sensor monitors the level of fluid in the channel and an adjacent agricultural region. The fluid sensor also monitors the flow rate of the fluid that flows from the channel to the region. An environmental sensor monitors environmental conditions ambient to the region. A control portion comprises a processor that calculates the accumulated data on the fluid level, flow rate, and environmental conditions to selectively displace the gate between an open position and a closed position relative to channel opening.

In some embodiments, the automated irrigation regulation assembly for controlling irrigation flooding comprises at least one irrigation regulation device configured to enable operational connectivity to a channel that is defined by a channel opening and is operational through a region. The at least one irrigation regulation device may include a mounting portion configured to enable mounting to the channel. The irrigation regulation device may further comprise a gate.

In some embodiments, the automated irrigation regulation assembly comprises a gate actuator configured to operatively attach to the gate. The gate actuator is further configured to selectively displace the gate between a closed position and an open position relative to the channel opening. The gate actuator may include an actuator receiver.

In some embodiments, the automated irrigation regulation assembly comprises an environmental sensor configured to record an environmental data in the ambient area of the region. The environmental sensor may include an environmental transmitter configured to transmit the environmental data.

In some embodiments, the automated irrigation regulation assembly comprises a fluid sensor configured to detect a predetermined level of fluid in the channel and the region. The fluid sensor is also configured to detect a flow rate of the fluid from the channel to the region. The fluid sensor may include a sensor transmitter configured to transmit a data signal upon detection of the predetermined level of fluid, or a predetermined flow rate, or both.

In some embodiments, the automated irrigation regulation assembly comprises a control portion comprising a transmitter and a receiver. The transmitter and the receiver are configured to communicate with the actuator receiver of the gate actuator, the environmental receiver of the environmental sensor, and the sensor transmitter of the fluid sensor.

In some embodiments, the control portion may also comprise of a processor that is configured to calculate the predetermined level of fluid in the channel and the region. The processor may also calculate a flow rate of the fluid from the channel to the region. The processor may also calculate the environmental data. In this manner, the calculations performed by the processor are determinative for displacement of the gate between the closed position and the open position.

In another aspect, the mounting portion of the irrigation regulation device comprises a pair of legs.

In another aspect, the irrigation regulation device comprises a motor configured to power the gate actuator.

In another aspect, the gate is defined by an interior face and an exterior face.

In another aspect, the seal is disposed concentrically on the interior face of the gate.

In another aspect, the gate actuator is a linear arm.

In another aspect, the arm slidably displaces the gate between the closed position and the open position.

In another aspect, the gate slides along a pair of rails positioned outside the channel opening.

In another aspect, the at least one environmental condition includes at least one member selected from the group consisting of: temperature, humidity, moisture, wind speed, and wind direction.

In another aspect, the fluid sensor comprises a control panel.

In another aspect, the receiver of the control portion is configured to receive the data signal consisting of the predetermined level of fluid.

In another aspect, the processor stores data consisting of the predetermined fluid levels.

In another aspect, the transmitter is a radio frequency transmitter configured to communicate with a remote control unit.

In another aspect, a plurality of irrigation regulation devices operate in sequence along the length of the irrigation channel.

One objective of the present invention is to automate control of water through an irrigation channel based upon water levels, water flow rate, and ambient environmental conditions.

Another objective is to provide a fully automatic assembly that both monitors and controls an irrigation channel running through an agricultural field to the extent that the need for employed labor is eliminated.

Another objective is to automate flooding of an agricultural region.

Another objective is to minimize wastage of fluid during flood irrigation by regulating the flow of fluid into the irrigation channel.

Yet another objective is to control the flow of fluid through a series of automated gate assemblies disposed along the length of the irrigation channel.

Yet another objective is to provide an irrigation gate which is relatively inexpensive and easily installed and which will control the level of water in a field.

Yet another objective is to provide a controllable flood irrigation system at minimum installation and operating costs.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings

BRIEF DESCRIPTION OF THE DRAWINGS

The invention will now be described, by way of example, with reference to the accompanying drawings, in which:

FIG. 11A shows a perspective view, FIG. 11B shows an elevated side view, and FIG. 11C shows a top view, in accordance with an embodiment of the present invention;

Like reference numerals refer to like parts throughout the various views of the drawings.

DETAILED DESCRIPTION OF THE INVENTION

Figure 1:
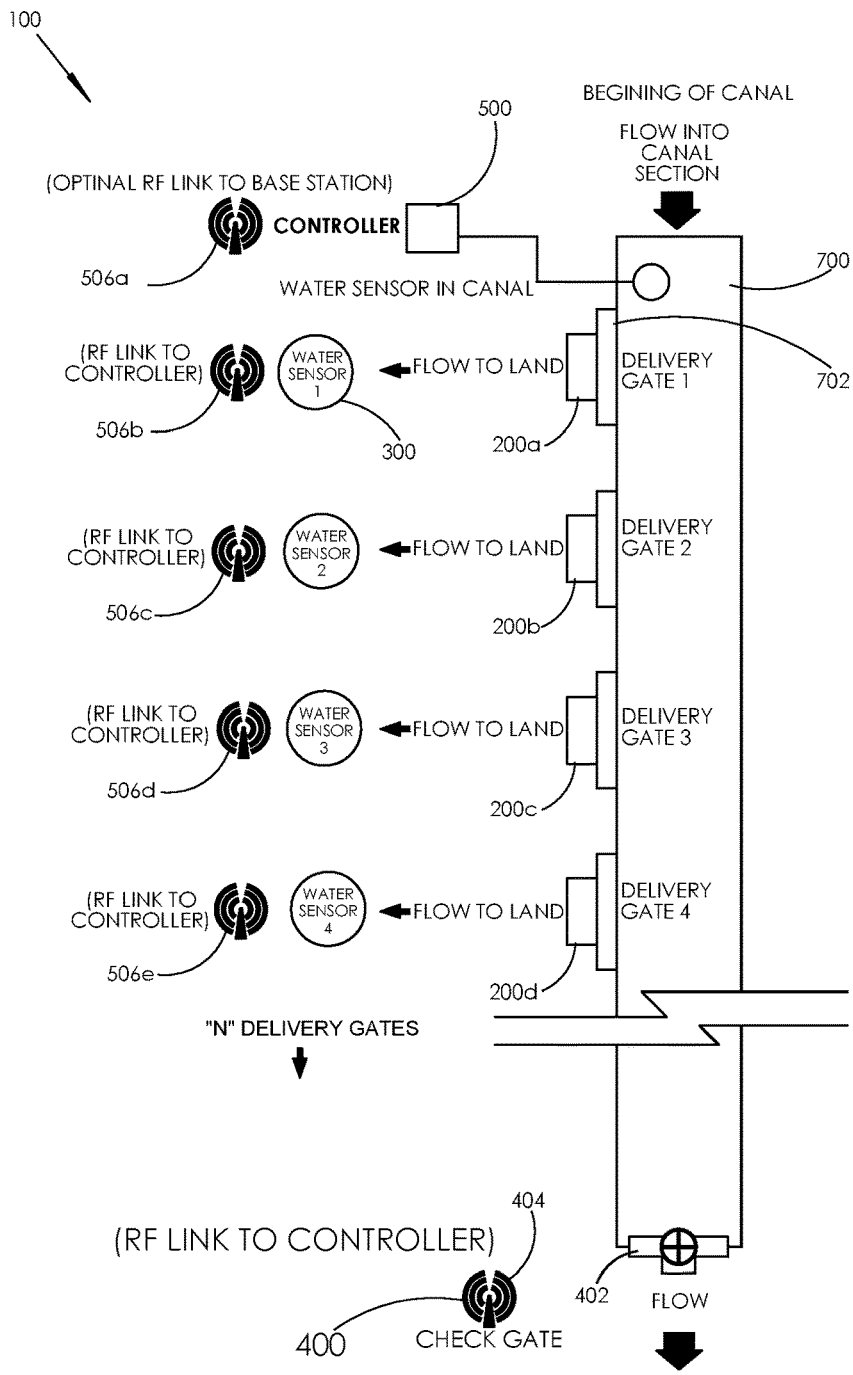
FIG. 1 illustrates a plan view of an exemplary automated irrigation gate system operational in an irrigational channel and region, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An automated irrigation gate system 100 and method 900 for controlling irrigation flooding in an irrigation channel and an agricultural region is referenced in FIGS. 1-16. The automated irrigation gate system 100 may help automate control of a fluid, such as water or liquid fertilizer, through a channel 700. The amount of fluid allowed to pass through a channel 700 and an adjacent region 704 through which the channel 700 passes, is based upon at least one of the following: a predetermined fluid level in the channel 700 and region 704, a flow rate of the fluid from the channel 700 to the region 704, and ambient environmental conditions in the ambient area of the region. This cumulative data is detected and communicated to a control portion 500 having a processor 512 that utilizes an algorithm to determine the appropriate position of a gate 206 that allows and restricts the fluid to enter the channel 700 based on the calculated data.

As shown in FIG. 1, the system 100 comprises at least one irrigation regulation device 200a-d that operationally attaches to a channel 700. The channel may include an irrigation channel known in the art. The channel 700 may be defined by a channel opening 702 through which the fluid enters the channel 700. The irrigation regulation device 200a-d is configured to regulate fluid flow through the channel opening 702 in the irrigation channel 700 through use of a slidably displaceable, and remotely controlled gate 206. Various sensors are used to determine the position of the gate 206 relative to the channel opening 702.

A fluid sensor 300 monitors the level of fluid in the channel 700 and an adjacent agricultural region 704. The fluid sensor 300 also monitors the flow rate of the fluid that flows from the channel 700 to the region 704. An environmental sensor 600 records at least one environmental condition in the ambient area of the region 704. A control portion 500 comprises a processor that calculates the accumulated data on the fluid level, flow rate, and environmental conditions to selectively displace the gate between an open position and a closed position relative to channel opening.

The irrigation regulation device 200a-d operatively attaches to a channel 700 to monitor a fluid level and a flow rate of a fluid in the channel 700 and the fluid level through an adjacent region 704. A gate 206 is remotely controlled to regulate flow of the fluid that discharges from a channel opening along the channel 700 and flows to the region 704. An environmental sensor 600 detects and transmits environmental data.

In some embodiments, a fluid sensor 300 detects a predetermined level of fluid in the channel and through the region, and then transmits a data signal upon detecting the predetermined fluid level. A processor calculates the predetermined fluid level, the flow rate from the channel to the region, and the environmental data. A processor calculates the predetermined fluid level, the flow rate from the channel to the region, and the environmental data; whereby the disposition of the gate 206 is determined by the calculations of the processor.

As referenced in the plan view of FIG. 1, the automated irrigation gate system 100 includes at least one irrigation regulation device 200a-d having a gate 206 that selectively regulates fluid flow into the irrigation channel 700. A fluid sensor 300 detects a predetermined level of fluid in the irrigation channel 700 and an agricultural region 704. A control portion 500 remotely controls actuation of the gate 206 based on a calculation of the predetermined level and flow rate of the fluid in the irrigation channel 700 and the irrigation region 704.

The at least one irrigation regulation device 200a-d comprises a mounting portion 202 and a gate 206. The disposition of the gate 206 is positioned to enable or restrict the flow of a fluid into the irrigation channel 700. The gate 206 selectively covers a channel opening 702. The gate 206 comprises a seal 208 that fits over the perimeter of the channel opening 702 to inhibit fluid leakage into the irrigation channel 700.

The fluid sensor 300 detects a predetermined level of the fluid that covers the irrigation channel 700 and the irrigation region 704. The fluid sensor 300 records the fluid level and transmits the data for processing. The fluid sensor 300 further comprises a transmitter 304 for transmitting a signal containing the fluid level in the agricultural region 704. Multiple fluid sensors may be operable throughout the agricultural region 704.

The control portion 500 has a processor 512, which may include PLC module, is configured to calculate the predetermined level of fluid in the irrigation channel 700 and the irrigation region 704. When a predetermined level of fluid is reached, the control portion 500 transmits a command signal to the irrigation regulation device 200a-d to actuate and alter the disposition of the gate in the irrigation channel 700. This enables or restricts the flow of fluid through the channel opening 702 into the irrigation channel 700, so as to enable fluid to flow to a portion of the agricultural region 704 adjacent the irrigation channel 700, or restrict the fluid flow into the irrigation channel 700.

Figure 2:
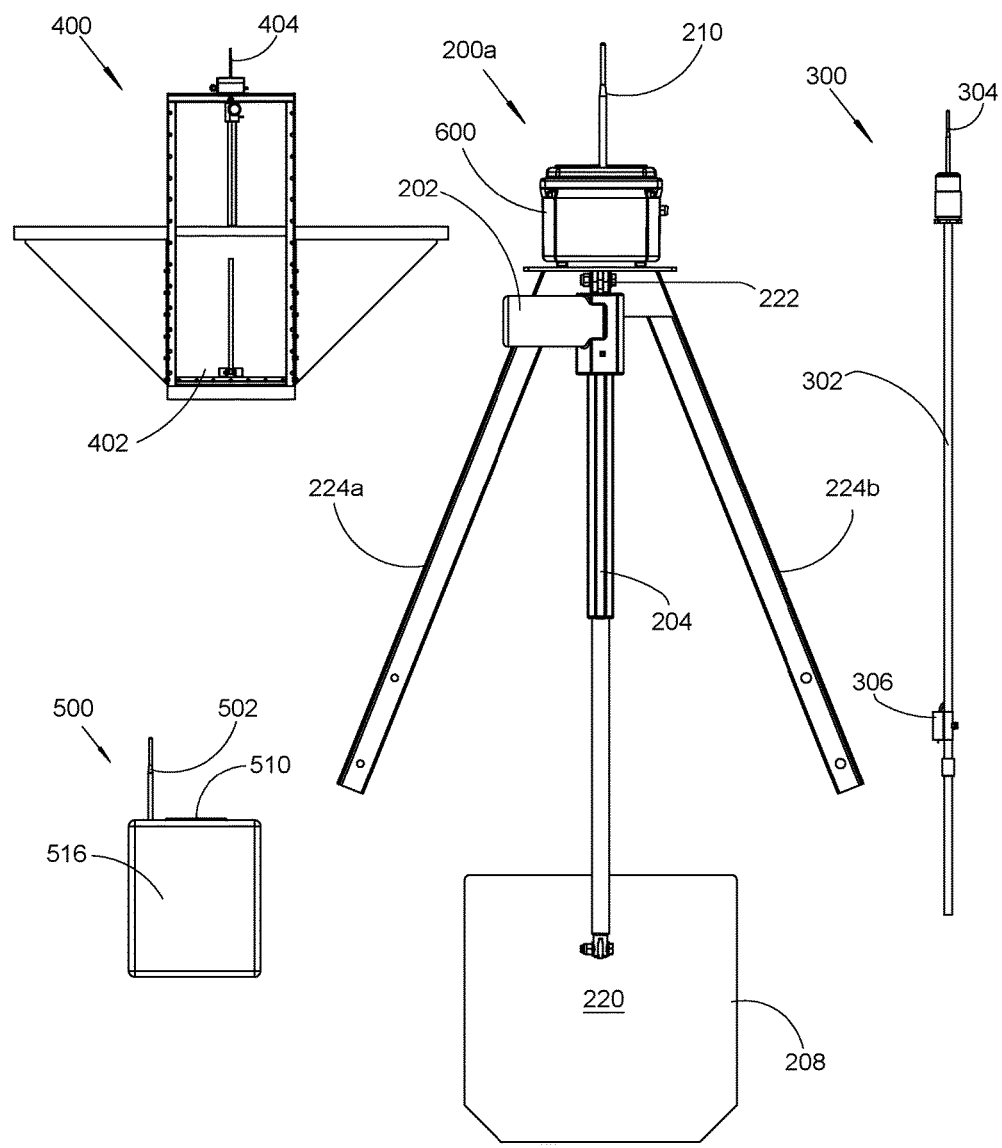
FIG. 2 illustrates a front view of an exemplary automated irrigation gate system, in accordance with an embodiment of the present invention.

Turning now to FIG. 2, one aspect of an automated irrigation gate system 100 for controlling irrigation flooding comprises at least one irrigation regulation device 200a-d configured to enable operational connectivity to a channel 700 defined by a channel opening 702, and operational through a region 704. The irrigation regulation device 200a-d may include a mounting portion 202 configured to enable mounting to a sidewall of the channel 700. The irrigation regulation device 200a-d may also include a gate 206 that selectively serves as a barrier to the channel opening 702.

The system 100 may also include a gate actuator 204 operatively attach to the gate 206, so as to selectively displace the gate 206 between a closed position and an open position relative to the channel opening 702. The gate actuator 204 may include an actuator receiver 210 for receiving commands to actuate the gate 206.

The system 100 may also include an environmental sensor configured to record at least one environmental condition in the ambient area of the region, the environmental sensor comprising an environmental transmitter configured to transmit environmental data based on the at least one environmental condition.

The system 100 may also include a fluid sensor configured to detect a predetermined level of fluid in the channel and the region, the fluid sensor further configured to detect a flow rate of the fluid from the channel to the region, the fluid sensor comprising a sensor transmitter configured to transmit a data signal upon detection of the predetermined level of fluid, or a predetermined flow rate, or both.

The system 100 may also include a control portion comprising a transmitter and a receiver, the transmitter and the receiver configured to communicate with the actuator receiver of the gate actuator, the environmental receiver of the environmental sensor, and the sensor transmitter of the fluid sensor.

The control portion may include a processor configured to calculate the predetermined level of fluid in the channel and the region, the processor further configured to calculate a flow rate of the fluid from the channel to the region, the processor further configured to calculate the environmental data. In this manner, the calculations performed by the processor are determinative for displacement of the gate between the closed position and the open position.

In another aspect, the mounting portion 202 of the irrigation regulation device 200a-d comprises a pair of legs 224a, 224b.

In another aspect, the irrigation regulation device 200a-d comprises a motor 226 configured to power the gate actuator.

In another aspect, the gate 206 is defined by an interior face 212 and an exterior face 220.

In another aspect, the seal 208 is disposed concentrically on the interior face 212 of the gate 206.

In another aspect, the gate actuator 204 is a linear arm.

In another aspect, the arm slidably displaces the gate 206 between the closed position and the open position.

In another aspect, the gate 206 slides along a pair of rails 214a, 214b positioned outside the channel opening 702.

In another aspect, the at least one environmental condition includes at least one member selected from the group consisting of: temperature, humidity, moisture, wind speed, and wind direction.

In another aspect, the fluid sensor 300 comprises a control panel.

In another aspect, the receiver of the control portion 500 is configured to receive the data signal consisting of the predetermined level of fluid.

In another aspect, the processor 512 stores data consisting of the predetermined fluid levels.

In another aspect, the transmitter is a radio frequency transmitter configured to communicate with a remote control unit.

In another aspect, the irrigation regulation device 200a-d supports an actuator receiver 210 that enables the gate actuator 204 to transmit and receive data pertinent to the fluid level, flow rate, and environmental data.

In another aspect, a plurality of irrigation regulation devices 200a-d operate in sequence along the length of the irrigation channel 700. In this arrangement, a first irrigation regulation device 200a may be operable at a first end of the channel 700; a second irrigation regulation device 200b may be operable at a spaced-apart distance from the first irrigation regulation device 200a; a third irrigation regulation device 200c is operable further along the channel 700; and a fourth irrigation regulation device 200d may be operable at a second end of the channel 700.

FIG. 1 illustrates a plan view of an exemplary automated irrigation gate system 100 operational along an irrigation channel 700 and an agricultural region 704. The automated irrigation gate system 100, hereafter "system 100" includes at least one irrigation regulation device 200a-d having a gate 206 that selectively regulates fluid flow into the irrigation channel 700. The system 100 further comprises a fluid sensor 300 to detect a predetermined level of fluid in the irrigation channel 700 and an agricultural region 704. The system 100 further comprises an environmental sensor 600 to record environmental data. The system 100 further comprises a control portion 500 for remotely controlling actuation of the gate 206 based on a calculation of the predetermined level of fluid in the irrigation channel 700 and the irrigation region 704.

Figure 3:
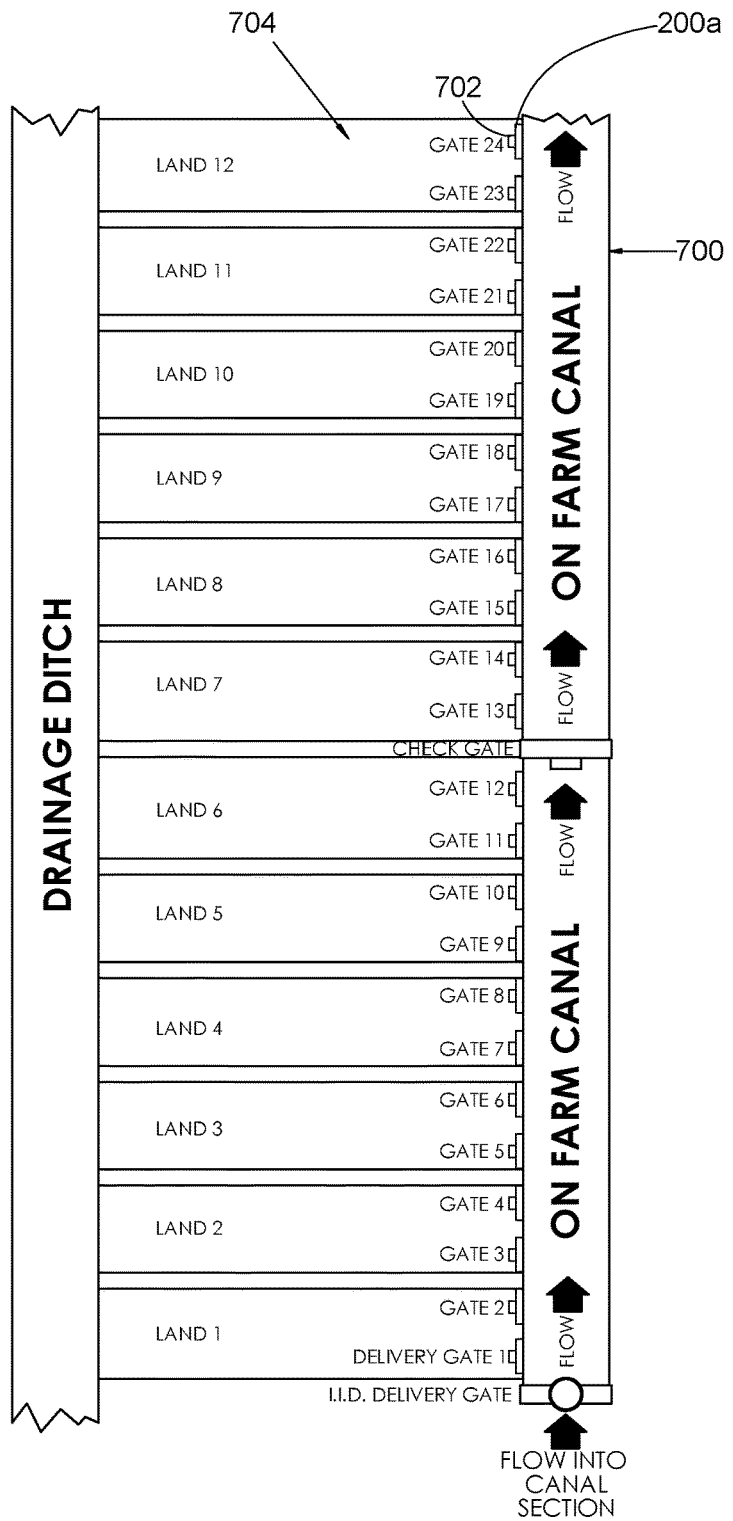
FIG. 3 illustrates a plan view of an exemplary irrigational channel and an adjacent agricultural region, in accordance with an embodiment of the present invention.

The automated irrigation gate system 100 regulates flow of a fluid, such as water or fertilizing substances, into a channel 700. As FIG. 3 shows, flood irrigation channels generally run the length of an agricultural region 704 to be irrigated, and may have one or more outlets to one or more irrigation bays. Flow control means for opening and closing of an individual outlet to the agricultural region 704 is controlled by signals emanating from a central barrier control unit.

The channel 700 may include an irrigation channel known in the art and defined by a continuous sidewall that extends from a narrow bottom end to a pair of upper edges. The channel 700 may include a channel opening 702 that enables the fluid to flow through the sidewalls, within the parameter of the bottom end and upper edges. When allowed to flow freely for a duration, the fluid may overflow past the upper edges, and thereby flood an adjacent agricultural region 704. This creates flooding irrigation.

Those skilled in the art will also recognize that on-farm flood irrigation operations are entirely manual and require considerable monitoring. As currently managed, flood irrigation does not easily lend itself to water conservation. This is because excess fluid is often allowed to flood the agricultural region 704. The assembly attempts to mitigate tail water runoff by about 5%+/−at a minimum by using sensors to detect the flow of fluid and the level of fluid in the irrigation channel 700 and the agricultural region 704, and then automatically adjusting the flow of fluid based on calculations of the flow rate and fluid level.

It is also known that alfalfa and feed grass production in much of the United States is irrigated by flood irrigation. This process is managed manually by seasoned field staff who are becoming increasing expensive and scarce. The job requires an irrigator to be on continuous duty for several days manually opening and closing many small delivery gates along an on-farm canal while monitoring the progress of flood waters along a field. The ideal situation is to provide adequate irrigation with minimal tail water runoff and conserving water.

As FIG. 3 references, a typical flood irrigated field has a canal installed along one side of a fairly level field with on-farm delivery gates located at regular intervals of about 55-80 feet apart. These gates bring water to agricultural regions, or long narrow segments of the field separated by mounds meant to facilitate sequencing flooding across the field. The delivery gates are made of light-gauge galvanized steel, more recently stainless steel, and vary in size from 12" to 18". They are embedded in the concrete lining of on-farm canals controlling flow through a short pipe running perpendicular to the canal through the levy separating the canal from a field.

Further, once the on-farm canal is full, delivery gates are manually opened by pulling its blade handle up uncovering the pipe opening and allowing flooding flows into an agricultural region. Irrigators, seasoned field staff that understand the specifics of each field and their crops, are on 24-hour duty during the multi-day irrigation sequence required to irrigate all the agricultural regions in a field. Two or more delivery gates are opened for each agricultural region while keeping a close eye on the tail water to make sure sufficient flow has covered the crop and secondarily minimizing tail-water discharge into a drainage ditch running perpendicular the agricultural regions. The irrigation efficiency is directly proportional to farming profitability; whereby flooding that does not sufficiently cover the tail of the agricultural region 704 reduces crop yield, while excessive fluid that flows into the ditch is an unrecoverable resource.

Figure 4:
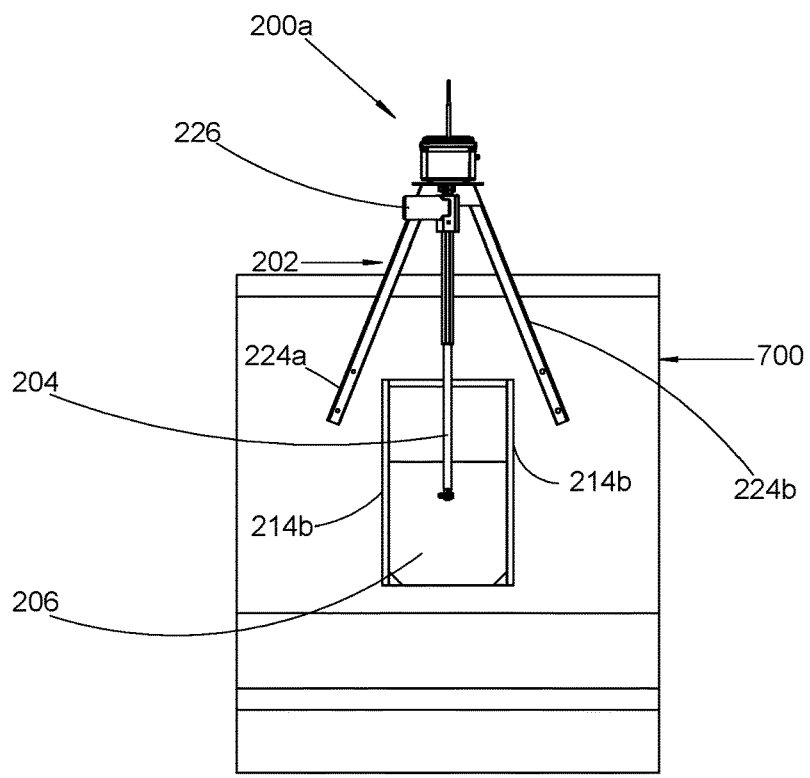
FIG. 4 illustrates a perspective view of an exemplary irrigation regulation device attached to a sidewall of an irrigation channel with a gate in a closed position over a channel opening, in accordance with an embodiment of the present invention.
Figure 5:
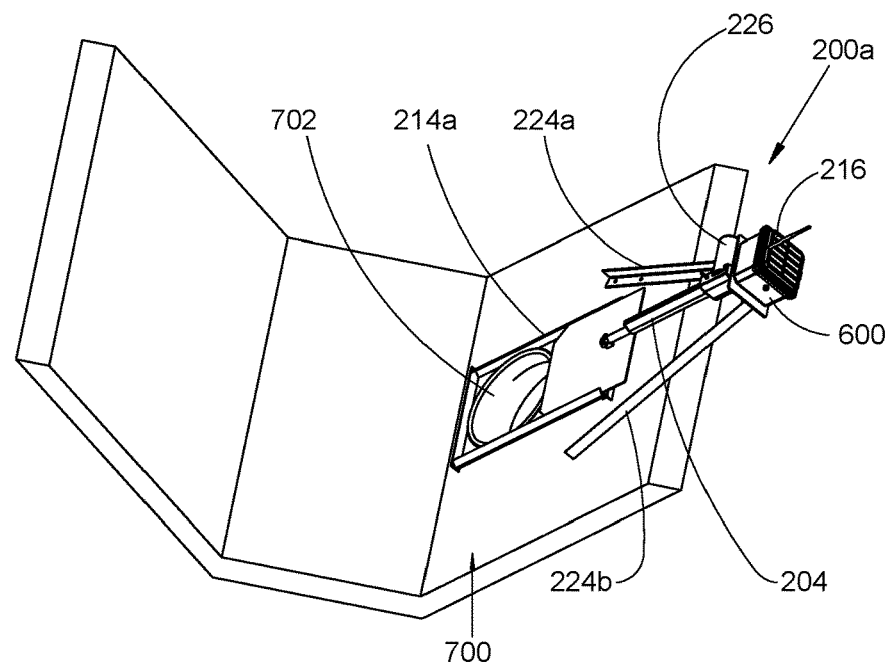
FIG. 5 illustrates a perspective view of at least one irrigation regulation device attached to a sidewall of an irrigation channel with a gate in an open position over a channel opening, in accordance with an embodiment of the present invention.

Turning now to FIGS. 4 and 5, the system 100 comprises at least one irrigation regulation device 202a-d that mounts on the sidewall of the irrigation channel 700, and in alignment with the channel opening 702. The irrigation regulation device 202a-d is the mechanism that selectively covers the channel opening 702 to permit and restrict passage of the fluid into the irrigation channel 700. FIG. 4 shows the channel opening 702 covered by a gate 206 from the irrigation regulation device 202a-d, and FIG. 5 shows the channel opening 702 uncovered, and thereby open to allow fluid to flow into the irrigation channel 700. In one embodiment, the gate 206 has a height of 15.5" and the channel opening 702 has a diameter of 13.37". Thus, the gate 206 has sufficient surface area to cover the channel opening 702.

Figure 6:
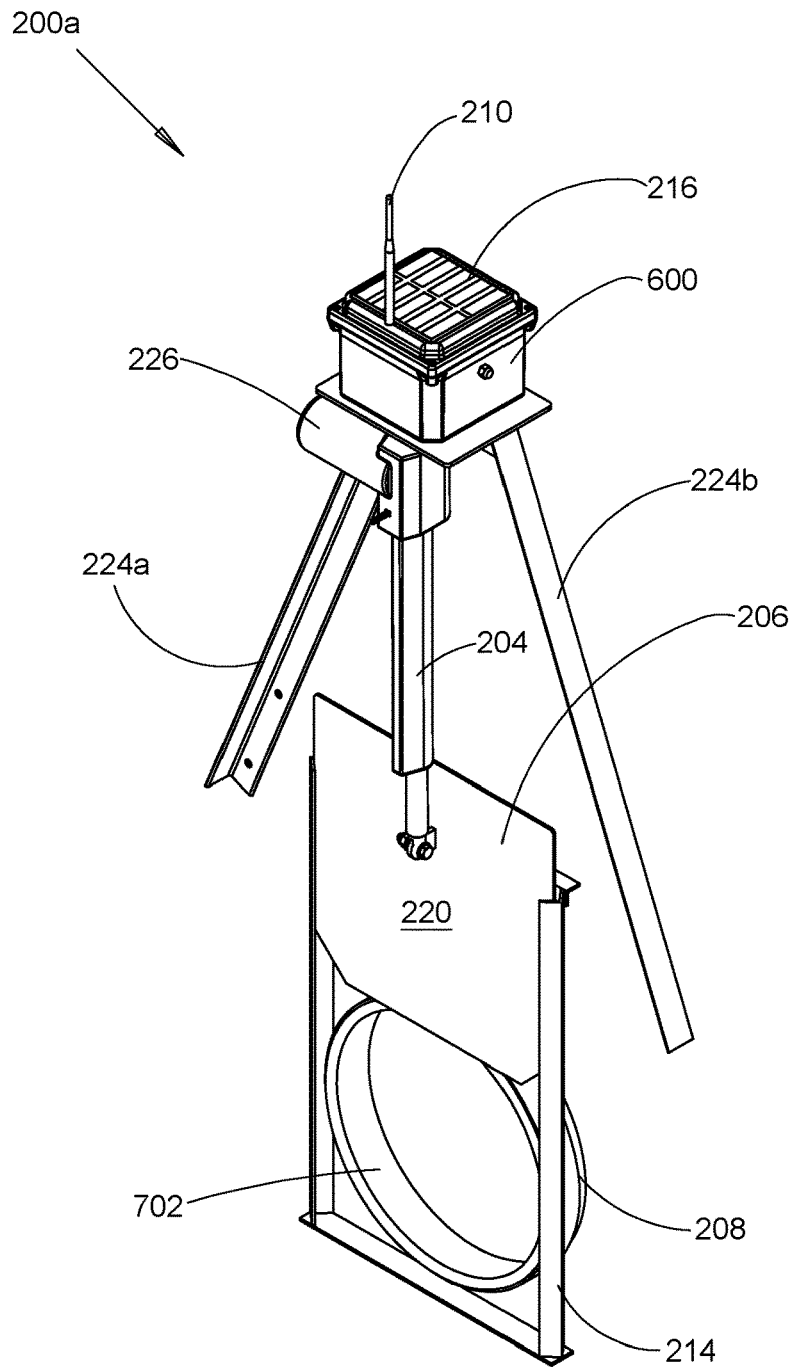
FIG. 6 illustrates a perspective view of at least one irrigation regulation device, in accordance with an embodiment of the present invention.
Figure 7:
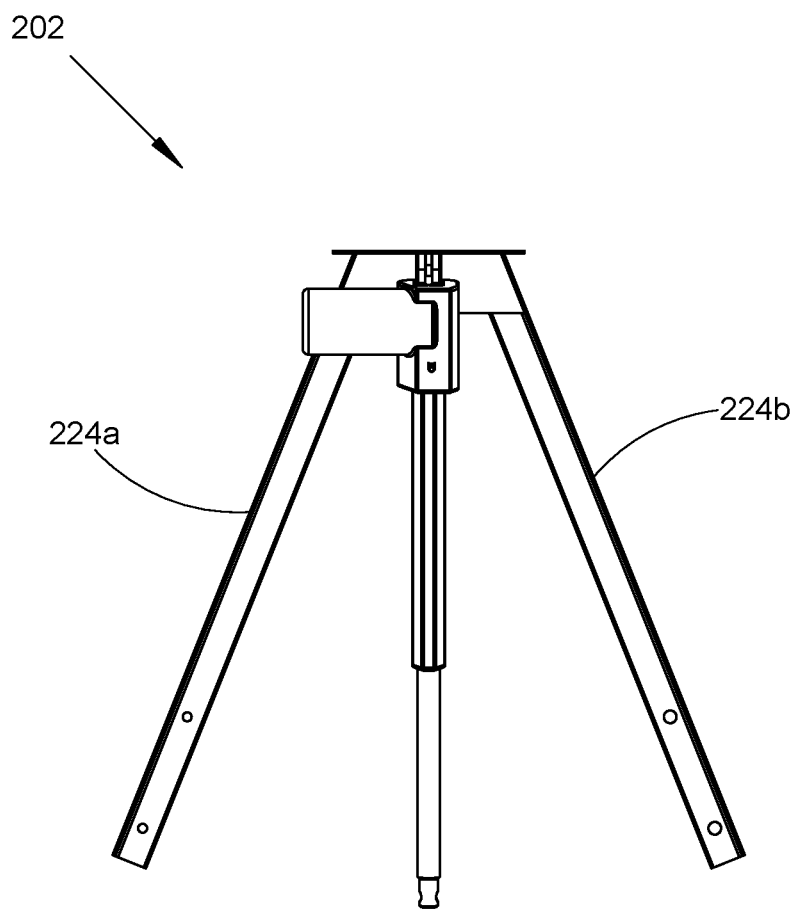
FIG. 7 illustrates a front view of an exemplary mounting portion of at least one irrigation regulation device, in accordance with an embodiment of the present invention.

In one embodiment, the irrigation regulation device 200a-d, as shown in FIG. 6, fastens to the sloped sidewall of the channel 700 and is adaptable to various sizes and shapes of irrigation channels known in the art. As FIG. 7 references, the irrigation regulation device 200a-d comprises a mounting portion 202 that enables detachable attachment to the sidewall of the channel 700. The mounting portion 202 is configured to mount the irrigation regulation device 200a-d to the irrigation channel 700 so that the gate 206 can selectively open and close over channel opening 702. In some embodiments, the mounting portion 202 may include a pair of legs 224a, 224b that fasten to the sidewalls of the channel 700. Legs 224a, 224b may be defined by fastening holes that enable passage of a screw or bolt for fastening to the channel sidewall.

The irrigation regulation device 200a-d further comprises a gate 206 that selectively covers a channel opening 702 that forms in the irrigation channel 700. A gate actuator 204 displaces the gate 206 between a closed position and an open position relative to the channel opening 702. The gate actuator 204 may include a linear actuator that slides the gate 206 to cover and uncover the channel opening 702. The gate 206 slides along a pair of rails 214a, 214b positioned outside the channel opening 702.

Figures 8, 9:
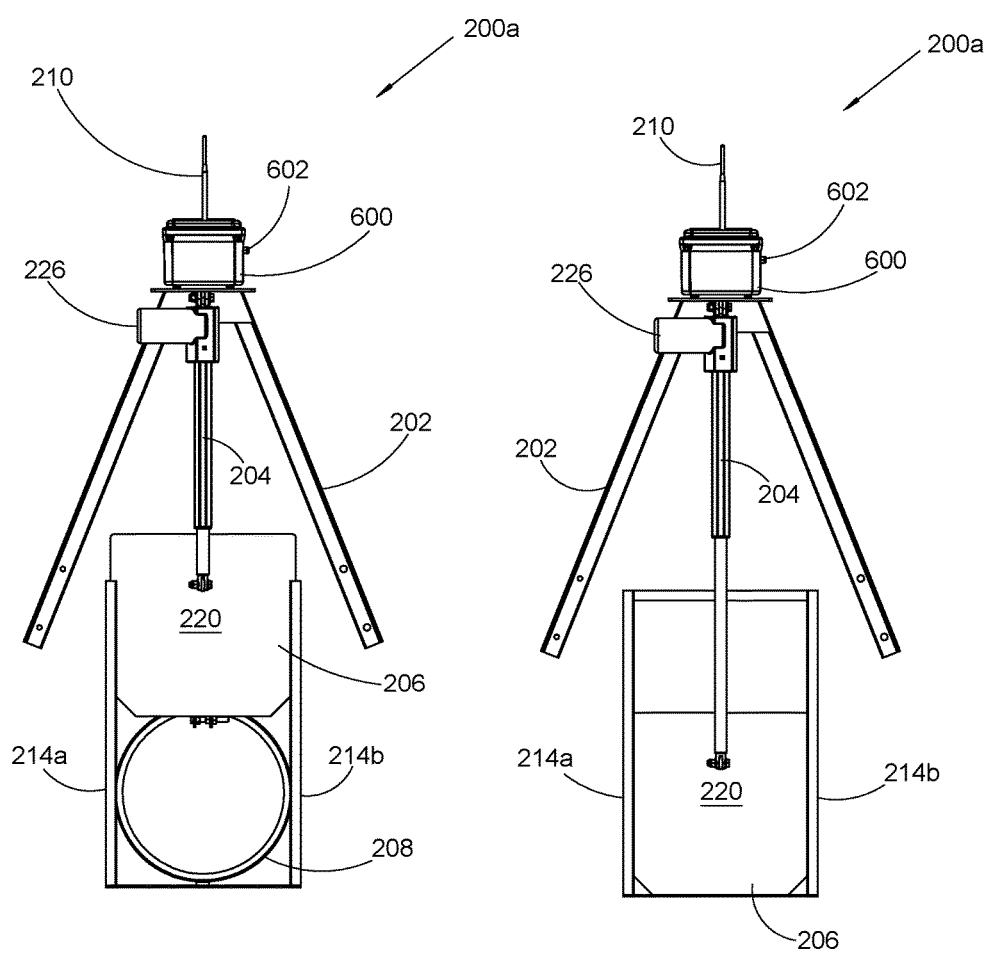
FIG. 8 illustrates a frontal view of at least one irrigation regulation device having a gate displaced to an open position, in accordance with an embodiment of the present invention.
FIG. 9 illustrates a frontal view of at least one irrigation regulation device having a gate displaced to a closed position, in accordance with an embodiment of the present invention.

As FIG. 8 illustrates, when the gate 206 is in the open position, the gate 206 is not covering the channel opening 702 and fluid can flow into the irrigation channel 700. As FIG. 9 shows, when the gate 206 is in the closed position, fluid is restricted from entering the irrigation channel 700. In one alternative embodiment, a solar panel 216 powers the gate actuator 204.

Figure 10:
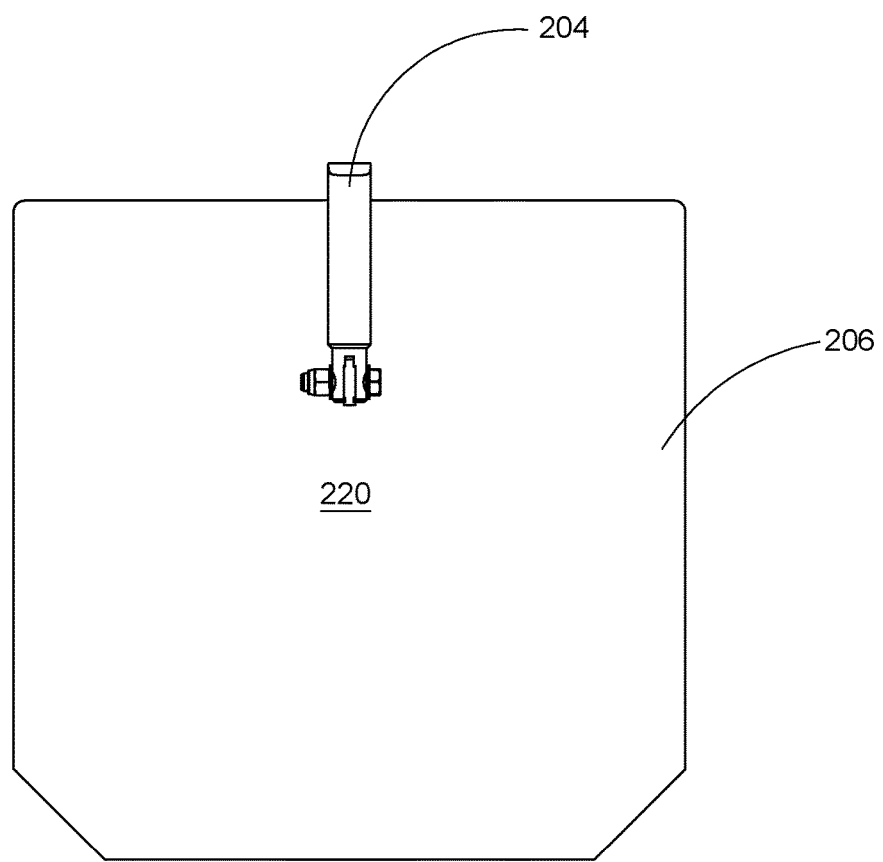
FIG. 10 illustrates a rear view of an exemplary gate attached to a gate actuator, showing an interior face of the gate, in accordance with an embodiment of the present invention.

Looking at the rear view of the gate 206 shown in FIG. 10, the gate 206 may be fabricated from light-gauge galvanized steel, and vary in size from 12" to 18". The gate 206 is defined by an internal side 212 and an external side 220. The internal side 212 engages a perimeter of the channel opening 702 when the gate 206 is in the closed position.

Those skilled in the art will recognize that a problem exists that with fluid flow in a channel, considerable momentum exists and if the gate is shut quickly then the water hammer effect may be sufficient to distort the gate so that it will no longer seal. Thus, the gate 206 may utilize a diameter adjustable seal 208 to create a more perfect, water tight junction with the perimeter of the channel opening.

Figures 11A, 11B, 11C:
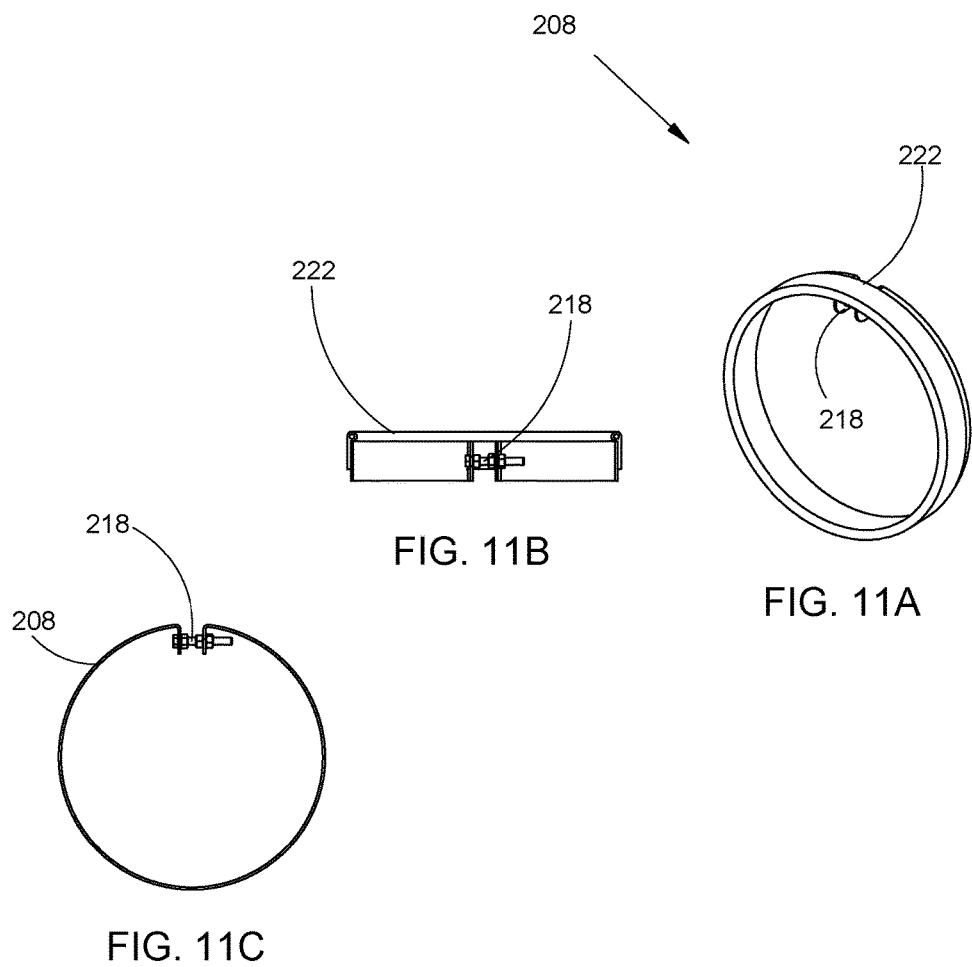
FIGS. 11A, 11B, and 11C illustrate views of an exemplary seal, where

As illustrated in FIG. 11A, the internal side 212 of gate 206 may include a seal 208 that is configured to create a water tight seal around the periphery of the channel opening 702. The seal 208 may include an annular rubber member that matches the perimeter of the channel opening 702. As shown in FIG. 11B, the seal 208 may also include an expansion joint 218 to expand and retract the diameter of the seal 208. The seal 208 may have a maximum diameter of about 14.75". In one alternative embodiment, a P-seal 222 may form around the perimeter of the seal 208 to enhance the engagement with the channel opening 702 (FIG. 11C).

It is known that since the irrigation channel 700 has a small gradient from a higher end to a lower end, fluid flow through the irrigation channel 700 is generally slow. To increase the flow of fluid through the irrigation channel 700 and facilitate flow, the irrigation channel 700 must be sectioned off and flow must be cut off with a check gate. The check gate, thus maintains proper levels of the fluid at the higher end of the canal.

Looking back at FIG. 2, a check gate 400, or a typical sluice gate, fits into and closes off flow at the termini of the irrigation channel 700. Similar to the irrigation regulation device 200a-d, a linear actuator is mounted on the yoke of the check gate 400 that can be exercised to raise or lower a panel 402. The displacement of the panel 402 serves to open or close off flow through the check gate 400. Multiple check gates may be positioned along the length of the irrigation channel 700 to raise the fluid level in the irrigation channel 700 and thereby increase flow rate of the fluid through the irrigation channel 700. A check gate antenna 404 transmits and receives signals for actuating the panel 402.

The system 100 disclosed here utilizes the gate 206 along the length of the channel 700, and the check gate 400 at the termini of the channel 700. One or both gates 206, 400 may be displaced by the gate actuator 204. The gate 206, or the check gate 400, or both operatively connects to a control portion 500 for controlling fluid levels and flow rates in the channel 700 and region 704, and is dependent on recorded fluid levels, flow rates, and environmental conditions.

In some embodiments, the system 100 may also include an environmental sensor 600 configured to record at least one environmental condition in the ambient area of the region 704. FIGS. 8 and 9 shows the environmental sensor 600 integrated into an irrigation regulation device 200a. In other embodiments, multiple environmental sensors may, however, position throughout the region 704.

In some embodiments, the environmental sensor 600 may include an environmental transmitter 602 that transmits an environmental data based on the recorded environmental condition. The environmental condition is used to determine ambient conditions in the agricultural region 704, which is used to help calculate the deposition of the gate 206. In some embodiments, the environmental condition may include, without limitation, temperature, humidity, moisture, wind speed, and wind direction. These environmental parameters may be combined with the fluid level and flow rate of fluid, discussed below, to determine the position of the gate over the channel opening 702.

Figures 12, 13:
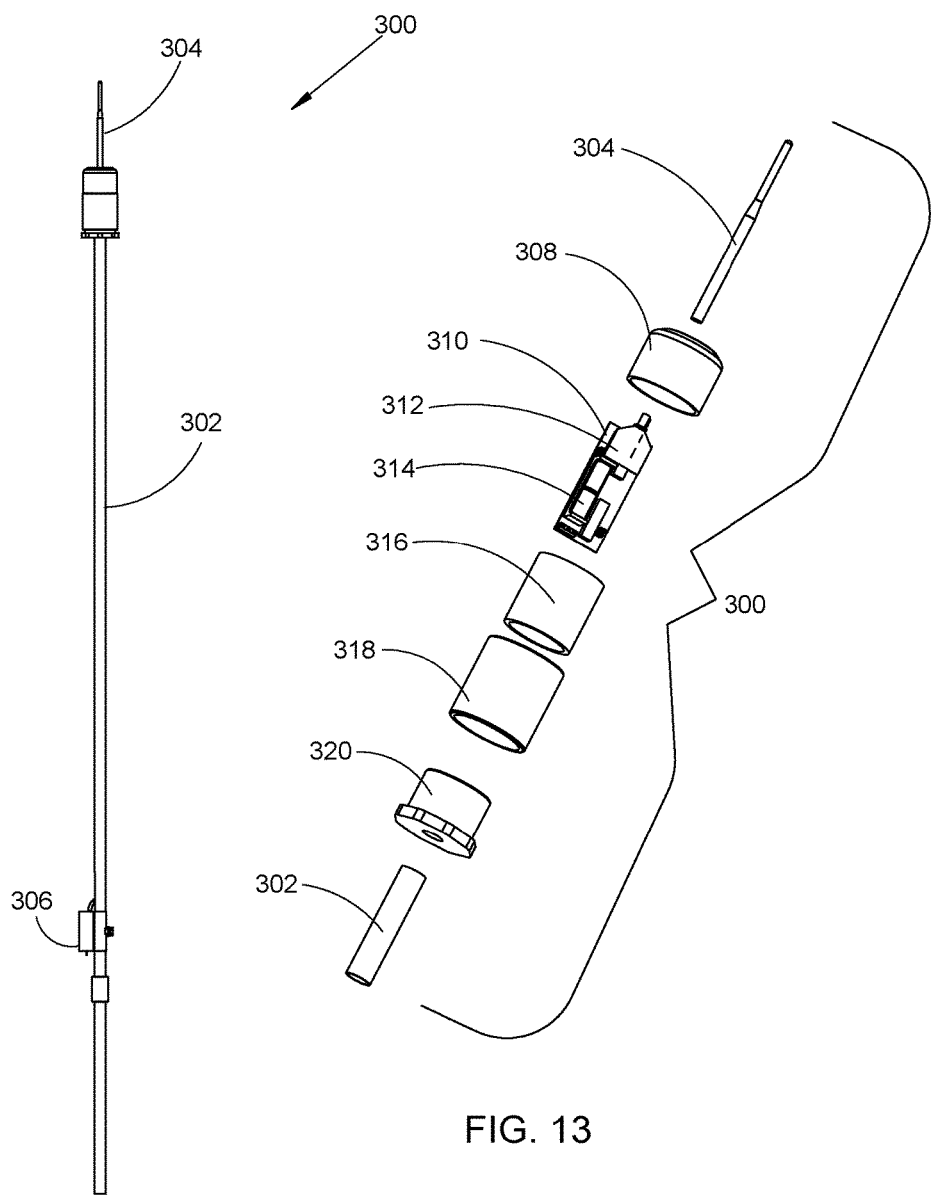
FIG. 12 illustrates a perspective view of an exemplary fluid sensor, in accordance with an embodiment of the present invention.
FIG. 13 illustrates an exploded view of a fluid sensor, in accordance with an embodiment of the present invention.

As FIG. 12 references, the system 100 may also include a fluid sensor 300 that detects a predetermined level of fluid in the channel 700 and the agricultural region 704. The fluid sensor 300 is defined by a first end 220 that joins with the gate, and a second end 222 that joins with the environmental sensor 600. The fluid sensor comprises a sensor transmitter configured to transmit a data signal consisting of the predetermined level of fluid. In one embodiment, multiple fluid sensors may position in multiple areas throughout the agricultural region 704. In this manner, a more uniform measurement of the fluid level may be determined.

As illustrated in FIG. 13, the fluid sensor 300 may include a radio-equipped smart assembly mounted to a mast 302 located at a convenient location down-field of a set of gates. The fluid sensor 300 has the capacity to manage gate assignment, incoming data, and radio frequency transmissions through a control panel 306. A sensor transmitter 304 enables radio frequency transmissions between the fluid sensor and the gate actuator platform. In one embodiment, the fluid sensor detects surface water level and transmits that data to a control portion 500 located along the irrigation channel 700. The control portion 500 may then command the gate associated with the fluid sensor to move to the close position.

Figure 14:
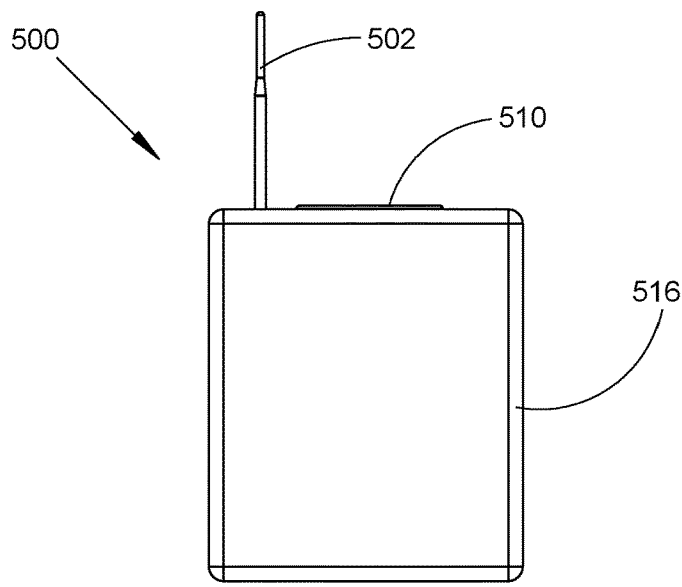
FIG. 14 illustrates a perspective view of an exemplary control portion, in accordance with an embodiment of the present invention.

As discussed above, the control portion 500 controls actuation of the gate 206 and communicates with the fluid sensor 300, the environmental sensor 600, and the irrigation regulation device 200a-d. FIG. 14 illustrates a housing 802 that protects and enables access to the internal components of the control portion 500. The control portion 500 comprises a transmitter 502 and a receiver configured to communicate with the fluid sensor, the environmental sensor 600, and the irrigation regulation device 200a-d. The transmitter 502 may also transmit the gathered data to a remote control unit having a database.

FIG. 14 also illustrates a blowup view of one possible version of a fluid sensor 300. The components include: a mast 302, a sensor transmitter 304 (antenna), a control panel 306, a lid 308, a microprocessor 310, a radio 312, a battery 314, a radio housing body 316, a radio coupling housing 318, and a radio body base 320. These components work together to detect moisture and communicate the findings. The level and flow rate of fluid in the channel 700 and region 704 may be determined through floats, hydrostatic devices, gravimetric devices, load cells, magnetic level gauges, and other fluid detecting means known in the art.

Figure 15:
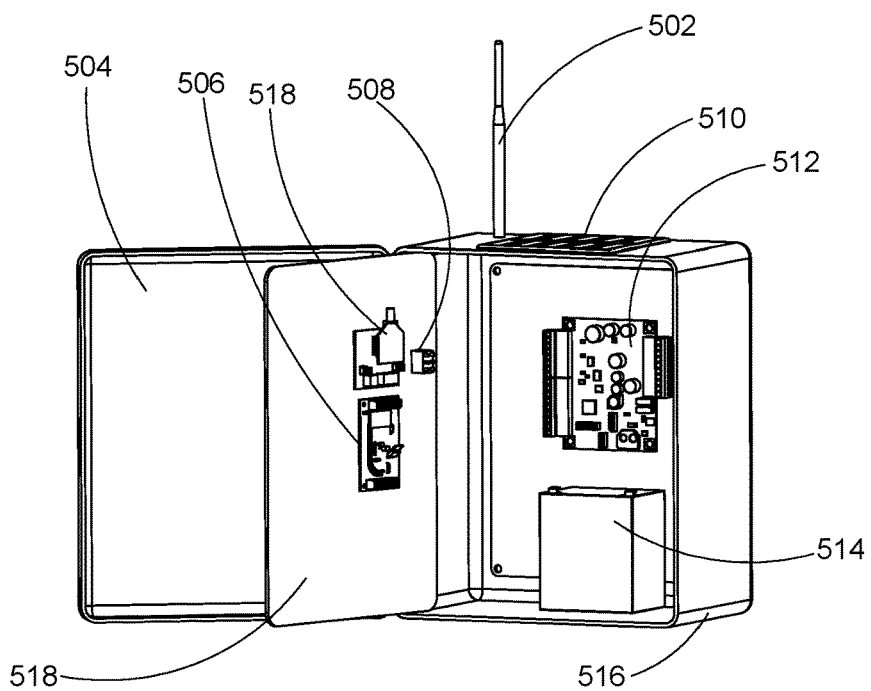
FIG. 15 illustrates a blow up view of a control portion, in accordance with an embodiment of the present invention.

As FIG. 15 references, a control portion 500. The control portion 500 comprises a processor 512 (PLC module) configured to calculate the predetermined level of fluid in the irrigation channel 700 and the irrigation region 704. The processor also calculates the flow rate of the fluid from the irrigation channel 700 to the irrigation region 704. In this manner, actuation of the gate between the closed position and the open position is based on the calculations performed by the processor.

In one embodiment, the control portion comprises a radio-based device, typically called a remote terminal unit (RTU), including a PLC-type controller that controls delivery gates based on data from the fluid sensor, a smart switch PCB board that when combined with fluid sensor in the irrigation channel 700 to activate the control portion when the fluid is delivered to the irrigation channel 700. The entire assembly is dormant until fluid is present for flood irrigation.

FIG. 15 illustrates a close up view of a control portion 500, including: a transmitter 502, a receiver 518, a master control cover 504, a processor 512 (PLC module), a swing panel 518, a radio frequency module 506a-f, a control solar panel 510, a switch module 508, a control battery 514, and a control housing 516. These components enable communication with the fluid sensor 300, environmental sensor 600, and gate actuator 204.

In one embodiment illustrated in FIG. 1, a first radio frequency module 506a is in communication with a base station. A second radio frequency module 506b is in communication with a controller. A third radio frequency module 506c is in communication with another controller. A fourth radio frequency module 506d is in communication with another controller. A fifth radio frequency module 506e is in communication with another controller. A sixth radio frequency module 506f is in communication with yet another controller. The radio frequency modules 506a-f may be operational throughout different areas of the region 704 and channel 700.

Figure 16:
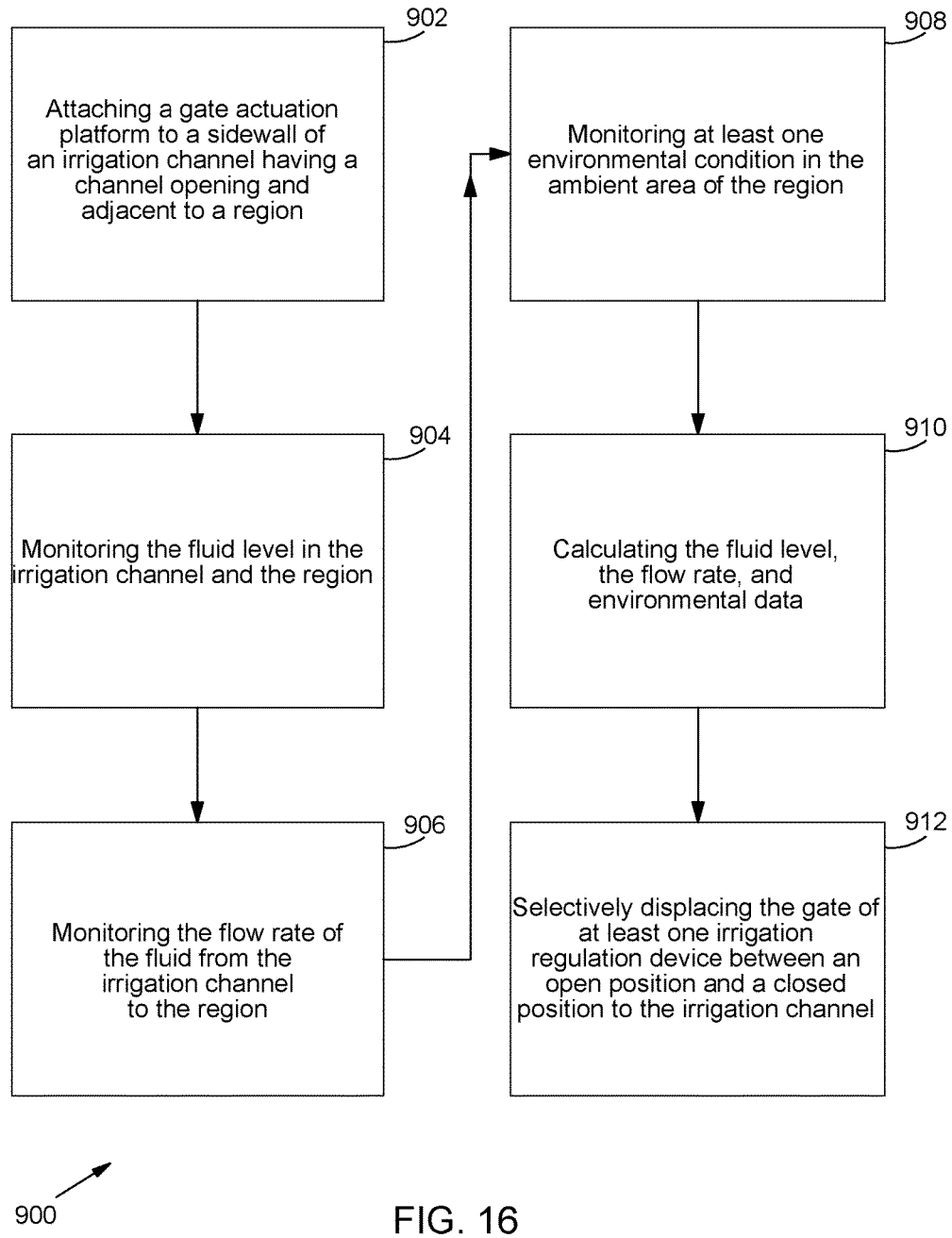
FIG. 16 illustrates a flowchart of an exemplary method for controlling flood irrigation with an automated irrigation gate system, in accordance with an embodiment of the present invention.

FIG. 16 references a method 900 for controlling flood irrigations with an automated irrigation gate system 100. The method 900 may include an initial Step 902 of attaching at least one irrigation regulation device 200a-d to a sidewall of an irrigation channel 700, the at least one irrigation regulation device comprising a gate, the irrigation channel disposed adjacent to a region and comprising a channel opening. Another Step 904 includes monitoring the fluid level in the irrigation channel 700 and the region 704.

In some embodiments, a further Step 906 may include monitoring the flow rate of the fluid from the irrigation channel 700 to the region 704. A Step 908 comprises monitoring at least one environmental condition in the ambient area of the region. Another Step 910 comprises calculating the fluid level, the flow rate, and environmental data. A final Step 912 involves selectively displacing the gate 206 of the at least one irrigation regulation device 200a-d between an open position and a closed position to control fluid entering the irrigation channel 700.

In exemplary experiments of the system 100, discussed below, a first field test was performed on Feb. 18-21, 2016. The region 704 upon which the first field test was conducted were Watch Technologies and Madjak Farms. A prototype system, including irrigation regulation devices 200a-d, fluid sensors 300, and control portions 500 were integrated on approximately 60 acres of Kleingrass on one of Madjac Farms fields in Holtville, Calif.

The farm is called Ash 180 after the Imperial Irrigation District (IID) delivery gate identification. The system controls twenty-four canal gates along an on-farm canal (FIG. 3) linked by hardwire to two controller stations with radio links to 12 Water-Present sensors, one per region (land). Each Water-Present sensor controls two Delivery gates. The first field test was conducted on Feb. 18-21, 2016, the second March 17-19. Extensive lab-testing preceded the field application.

In the experiment, it was discovered that the Ash 180 AutoFlood system was designed to completely automate flood irrigation by initially "waking up" the system when water was detected in the on-farm canal associated with the Lands to be irrigated then sequentially opening and closing pairs of delivery gates on twelve 2500'×110' Lands based on data received from Water-Present sensors initially located roughly 75% down-field of the on-farm canal. Water-Present sensors detected water at approx. 1" above the field surface.

Overall, the system 100 worked as predicted; the system activated automatically, WP sensors reported water sending a message via RF to an appropriate controller, and gates were closed when irrigation was completed on a Land and opened on the next Land in sequence. There was, however, less than 100% reliability in each of the three AutoFlood systems during the first field test.

The fluid sensors 300 used were water present (WP) sensors. The WP sensors worked as designed and lab-tested. The WP sensors reported water as it covered their probes at a desired level above field surface. Initially, there was less than perfect reliability regarding transmission success to the controller; several of the installed relays once latched would not return to off and waiting thereby giving a false-positive water-present message. Watch's testing procedure contributed to the problem; sensors were lab and field-tested in water so it was not possible to determine if the relays were improperly latched prior to testing. Watch was able to reset those few sensors that were permanently latched in the field and thereby activate gate closures but, of course, they were required to operate without human intervention.

Two control portions 500 were also used in the experiment. The controllers performed as expected. The AutoFlood system 100 for this first application used two hardwire interconnected Controllers to control 24 gates in sets of 12 gates. A few minor problems occurred marring 100% Controller performance. These problems were entirely related to software improperly reacting to out-of-sequence messages from Water-Present sensors 300 that occurred due to the relay issue noted above.

The gate 206 and gate actuator 204 operated well, responding to commands from either controller. Battery voltage remained high even though the gates were activated much more than anticipated normal during testing. No systemic electrical problems emerged. Increasing the initial very conservative fusing limits was, however, required to account for occasional increased electrical demand to get the linear actuators past debris accumulated in the gate guides.

Water was efficiently conserved during the first field test. Watch Technologies predicted 5% net water conservation using AutoFlood over manually controlled systems. While tail water data is available on the test farm, accurate historical data from the point of delivery was not. Imperial Irrigation District (IID) staff have their ways both traditional and technical to measure flow into an on-farm canal. In advance of the AutoFlood field test Madjac Farms requested IID install a flow monitoring device at the heading of its on-farm canal to more accurately monitor flow into the test field.

Furthermore, Madjac historical tail water runoff flow was reported to Watch at 8-13% of irrigation flooding flows. Following the test, inflow and tail water discharge data were examined. Even though Water-Present sensors could have been located closer to the canal thereby reducing delivery gate-open time, tail water discharge amounted to 4.7% of delivery flow. Runoff reduction of 3-8% was achieved while flooding coverage was excellent.

Thus, the first AutoFlood field test clearly demonstrated that maximizing floodwater conservation using the system will require the following:

1) Care in the placement of Water-Present sensors so flow onto a Land is stopped as early as possible to limit tail water runoff while assuring proper coverage. Mapping the site and Water-Sensor placement will eventually produce locations best suited for the time of year and crop. Permanent placement of the sensor, perhaps in the mounds separating Lands, and using selectable time-based delays in software to manage variable flow stops will be the likely long-term solutions. Implementing time stamps for all on-farm radio communications and storing them at the controller for download will provide a useful tool for managers to compare elapsed irrigation time on each Land against tail water runoff and sensor location.

2) Careful coordination with IID so flow into the on-farm canal is stopped when irrigation on a field is complete. The obvious and best solution would be to automate the Ash 180 delivery gate such that it could close when irrigation was complete.

3) Good data collection practices are in place to calculate total flow onto each field and into the tail water ditch.

The Ash 180 system was challenged to keep gates 23 and 24 open even when irrigation was complete to make sure inflow to the on-farm canal had a place to go other than overtopping the on-farm canal if water delivery from IID was not terminated when irrigation was complete. The system managed to maintain IID flow for 12 hours after irrigation was complete so the precaution regarding gates 23 and 24 was important.

A second field test was conducted on March 17-19. Improvements in Water-Present sensor software were implemented and replacement water probes nearly eliminated the relay latching problem and allowed for better monitoring of RF broadcasting. The latching problem will be completely solved with non-latching relays installed in water sensor probes by their manufacturer. Improved transmission oversight allowed Watch to more closely monitor all component transmissions assuring accurate observations of Water-Sensor performance and controller responses. All systems improved dramatically to nearly 100% successful operations; AutoFlood worked well.

The second field test verified AutoFlood's performance potential. It was also deduced that changes could be made to the system to reduce installed cost, improve reliability, and provide better data acquisition and storage for long-term operations planning.

For example, cost reductions may be made by converting to radio-only communication. Hardwiring the link between gates and the controllers proved costly not only for the extensive wiring but because it required special PCB boards in the controller to command gates and inherently limited the number of gates controlled by a single controller. Hardwiring was fine for prototyping but was never intended for the commercialized product. It was also discovered in the second field test that only one controller had no practical limit to the number of gates that could be controlled.

Further, reliability could be improved through component modification and manufacturing techniques. As noted above, water probes may be manufactured with non-latching relays to avoid any potential issues associated with powering the relays open after latching. Switching to surface-mount PCBs may enhance chip stability and avoid manufacturing errors. Software may be changed to time-stamp and log all operations, allow for sequencing changes and changing gate-to-WP sensor assignments, and provide the option for sending operational data to a remote Base Station.

The second field test also elucidated possible commercial advantageous from the system 100. Commercial Installing on-farm automation can return economic value if it can save sufficient labor cost to warrant installation without compromising crop yield, reduce direct costs for irrigation water, and in the case of the IID, generate revenue through demonstrated water conservation. Field tests of the prototype AutoFlood system indicate that the system can meet all three tests.

The second field test also discovered that labor costs could also be reduced by the system. This is because monitoring manual flood irrigation requires 24 hour active supervision of the process. This includes periodically measuring where water is relative to the tail water runoff ditch on each land by "stepping-off" the distance several times, timing when water should be cut off on the Land, and then closing gates when it is assumed water flow downfield on the Land can complete the irrigation.

Initial testing of the prototype AutoFlood system was never intended to replace close monitoring since the system had no performance record and placement of the Water-Present sensors down-field of the on-farm canal was not clearly understood. By the second test, the irrigator in charge was, however, confident enough in the system and sensor placement to simply monitor when water "hit" the sensor probes and then watch for gate actuation at the on-farm canal. After a few more irrigation cycles, the irrigator will, at most, monitor actuation of the gates.

It may, however, be up to farm management to decide when the system has proved sufficiently reliable to allow un-monitored irrigation. Protective measures to deal with potential canal overflowing due to sensor or gate actuator failure, such as sequencing gate actuation so that at no time during an irrigation cycle will all gates be closed, gates remaining open will pass flow equal to canal inflow, and installing level sensors in the canal that trigger gate openings to assure canal level stays within an acceptable deadband, will enhance confidence.

The second field test also helped to better understand the cost of water and conservation revenue that could be generated. The reason water conservation is important goes beyond the obvious need to maximize use of limited resources. Demonstrated on-farm conservation pays farmers in the IID $285 per acre foot. Given the average 6.5-7.0 acre foot allocation per acre per year in the IID, a 5% demonstrated decrease in water consumption will earn a minimum $92.65 per year per acre. Automation throughout the grass and Alfalfa flood irrigated acres within the IID (approx. 235,000 acres) could mean conserving and average of 76,375 acre feet of water with a value to farmers of $21.7 million per year.

Even though delivered water cost in the IID is low, it is a cost. Both field tests have confirmed that automation reduces tail water runoff which will reduce IID delivery requirements. Without active local control of the Ash 180 gate at the test site, there is, however, limited opportunity to stop flow into the on-farm canal when desired. For example, IID needs 3 hours to get staff to the delivery gate and even if requested staff workloads and on-site timing can extend that dramatically as happened during both field tests.

At this stage in the course of on-farm flood irrigation automation two important water delivery issues need to be resolved to maximize automation value with respect to farmers; 1) when flows onto a farm are officially "stopped" for purposes of billing and 2) accurately calculating flow onto the farm with the purpose of demonstrating conservation against historical use. Agreement on how to calculate flow into the on-farm canal is a more complicated task and beyond the scope of this paper but it has everything to do with how IID will determine the value of conserved water.

A cost vs. benefit analysis shows that the AutoFlood system as installed with hardwire connections to the controllers would cost $39,196 or $516 per acre on a field like the prototype site with 24 gates at 55' spacing assuming 2 gates per Land and 2500 ft. deep Lands; roughly 77 ac. Yearly maintenance is negligible. Projected installed cost for Rev 2 on the same field is $30,796 or $407 per acre.

Assuming proper placement of the Water-Present sensor, a farmer can expect to conserve 5-15% of flood water requirements based on current modeling, fields tests completed, and historical use. In the Imperial Valley where irrigation typically requires 6-7 ft of water per acre per year, the value of conserved water using the lowest projected conservation value, $7134, would pay for the installed system within 5.49 years, the Rev 2 radio-only commercialized system in 4.3 years Labor savings are hard to calculate at this point without a commercialized system in place for a season or more. Given that an irrigator would be able to manage several fields at a minimum rather than one or two at a time will reduce costs dramatically. Irrigators will no longer have to measure distances or estimate flow times downfield or manually operate the gates.

Assuming a farmer with several to many fields, the irrigator position will, however, be changed from fairly labor intensive to one of monitoring and management with a likely renegotiation of responsibilities and compensation. It is reasonable to estimate reducing the cost of irrigating 60-75% until the systems are proven then 90% after that.

Based on the current range of cost from $63-100 per acre, the value of labor savings and water conservation values on the test field are presented in the table below:

|  | $63/AcYr | $100/AcYr |
|---|---|---|
| Test Field Yearly Irrigator Cost | | |
| 90% Irrigator Cost Reduction | 4309 | 6840 |
| 75% Irrigator Cost Reduction | 3591 | 5700 |
| 60% Irrigator Cost Reduction | 2873 | 4560 |
| 5% Conservation value | 7147 | 7147 |
| Total Labor Savings and Conservation Value | | |
| 90% Irrigator Cost Reduction | 11443 | 14268 |
| 75% Irrigator Cost Reduction | 10725 | 12834 |
| 60% Irrigator Cost Reduction | 10007 | 11694 |
| AutoFlood Payoff Years Combined Value | | |
| 90% Irrigator Cost Reduction | 2.7 | 2.2 |
| 75% Irrigator Cost Reduction | 2.8 | 2.4 |
| 60% Irrigator Cost Reduction | 3.1 | 2.6 |
| AutoFlood Payoff Years Labor Saving Only | | |
| 90% Irrigator Cost Reduction | 7.2 | 4.5 |
| 75% Irrigator Cost Reduction | 8.7 | 5.4 |
| 60% Irrigator Cost Reduction | 10.8 | 6.8 |

In conclusion, the first field tests of AutoFlood on-farm flood irrigation control technology demonstrated that is does work and it will improve income while mitigating the personnel problems associated with manual irrigation control. Value for water conservation and reducing labor through proven reliability of automation are the keys to payoff efficiency. Good farming will never eliminate human management but irrigation automation will improve water conservation and farming outcomes.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An automated irrigation gate system for regulating fluid levels in an irrigation channel having at least one channel sidewall and an agricultural region, the system comprising:
at least one irrigation regulation device configured to enable operational connectivity to a channel defined by a channel opening and operational through a region, the at least one irrigation regulation device comprising a mounting portion configured to enable mounting to the channel, the at least one irrigation regulation device further comprising a gate;
wherein the mounting portion of the at least one irrigation regulation device comprises a pair of inclined legs configured to fasten to the at least one channel sidewall of the irrigation channel;
a gate actuator configured to operatively attach to the gate, the gate actuator extending between the pair of inclined legs and further configured to selectively displace the gate between a closed position and an open position relative to the channel opening, the gate actuator comprising an actuator receiver;
an environmental sensor supported by the pair of inclined legs, the environmental sensor configured to record a plurality of environmental conditions in the ambient area of the region, the environmental sensor comprising an environmental transmitter configured to transmit environmental data based on the plurality of environmental conditions, the plurality of environmental conditions including any combination of temperature, humidity, moisture, wind speed, and wind direction;
a fluid sensor configured to detect a predetermined level of fluid in the channel and the region, the fluid sensor further configured to detect a flow rate of the fluid from the channel to the region, the fluid sensor comprising a sensor transmitter configured to transmit a data signal upon detection of the predetermined level of fluid, or a predetermined flow rate, or both; and
a control portion comprising a transmitter and a receiver, the transmitter and the receiver configured to communicate with the actuator receiver of the gate actuator, the environmental transmitter of the environmental sensor, and the sensor transmitter of the fluid sensor, the control portion further comprising a processor configured to calculate the predetermined level of fluid in the channel and the region, the flow rate of the fluid from the channel to the region, and the environmental data, whereby the calculations performed by the processor are determinative for displacement of the gate between the closed position and the open position.

2. The system of claim 1, wherein the at least one irrigation regulation device comprises a motor configured to power the gate actuator.

3. The system of claim 1, wherein the gate is defined by an interior face and an exterior face.

4. The system of claim 3, wherein the gate comprises a seal configured to enable the formation of a water tight junction with the channel opening.

5. The system of claim 4, wherein the seal is disposed concentrically on the interior face of the gate.

6. The system of claim 1, wherein the gate actuator is an arm that slidably displaces the gate between the closed position and the open position.

7. The system of claim 1, wherein the gate slides along a pair of rails positioned outside the periphery of the channel opening.

8. The system of claim 1, wherein the plurality of environmental conditions includes temperature, humidity, moisture, wind speed, and wind direction.

9. The system of claim 1, wherein the receiver of the control portion is configured to receive the data signal consisting of the predetermined level of fluid, the flow rate of the fluid from the channel to the region, and the environmental data.

10. The system of claim 1, wherein the at least one irrigation regulation device supports the gate actuator for enabling transmission and reception of data pertinent to the fluid level, flow rate, and environmental data.

11. The system of claim 1, further comprising a solar panel configured to power the gate actuator.

12. The system of claim 1, wherein the fluid sensor includes at least one of the following: a mast, a sensor transmitter, a control panel, a lid, a microprocessor, a radio, a battery, a radio housing body, a radio coupling housing, and a radio body base.

13. The system of claim 1, wherein the control portion comprises at least one of the following: a master control cover, a swing panel, a radio frequency module, a control solar panel, a switch module, a control battery, and a control housing.

14. The system of claim 1, wherein the processor of the control portion consists of an algorithm that processes and stores data pertinent to the fluid level, the flow rate, and the environmental conditions.

15. The system of claim 1, further comprising a check gate operational in conjunction with the gate at the channel, the check gate comprising a panel and a check gate antenna.

16. An automated irrigation gate system for regulating fluid levels in an irrigation channel having at least one channel sidewall and an agricultural region, the system comprising:
at least one irrigation regulation device configured to enable operational connectivity to a channel defined by a channel opening and operational through a region, the at least one irrigation regulation device comprising a mounting portion configured to enable mounting to the channel, the at least one irrigation regulation device further comprising a gate;
a seal configured to enable the formation of a water tight junction with the channel opening, the seal comprising an expansion joint configured to expand and retract the diameter of the seal;
a pair of rails;
wherein the mounting portion of the at least one irrigation regulation device comprises a pair of inclined legs configured to fasten to the at least one channel sidewall of the irrigation channel;

a gate actuator configured to operatively attach to the gate, the gate actuator extending between the pair of inclined legs and further configured to selectively displace the gate between a closed position and an open position relative to the channel opening along the pair of rails, the gate actuator comprising an actuator receiver;

an environmental sensor supported by the pair of inclined legs, the environmental sensor configured to record a plurality of environmental conditions in the ambient area of the region, the environmental sensor comprising an environmental transmitter configured to transmit environmental data based on the plurality of environmental conditions, the plurality of environmental conditions including any combination of temperature, humidity, moisture, wind speed, and wind direction;

a fluid sensor configured to detect a predetermined level of fluid in the channel and the region, the fluid sensor further configured to detect a flow rate of the fluid from the channel to the region, the fluid sensor comprising a sensor transmitter configured to transmit a data signal upon detection of the predetermined level of fluid, or a predetermined flow rate, or both; and a control portion comprising a transmitter and a receiver, the transmitter and the receiver configured to communicate with the actuator receiver of the gate actuator, the environmental transmitter of the environmental sensor, and the sensor transmitter of the fluid sensor, the control portion further comprising a processor consisting of an algorithm, the processor configured to calculate the predetermined level of fluid in the channel and the region and the flow rate of the fluid from the channel to the region, whereby the calculations performed by the processor are determinative for displacement of the gate between the closed position and the open position.

17. The system of claim 16, wherein the seal comprises a P-seal.

18. A method for regulating water levels in an irrigation channel and an agricultural field with an automated irrigation gate system, the method comprising:

attaching at least one irrigation regulation device having a mounting portion with a pair of inclined legs to at least one channel sidewall of an irrigation channel by fastening the pair of inclined legs to the at least one channel sidewall, the at least one irrigation regulation device comprising a gate actuator extending between the pair of legs, a gate operably attached to the gate actuator and an environmental sensor supported by the pair of inclined legs, the irrigation channel disposed adjacent to a region and comprising a channel opening;

monitoring the fluid level in the irrigation channel and the region;

monitoring the flow rate of the fluid from the irrigation channel to the region;

monitoring a plurality of environmental conditions in the ambient area of the region, the plurality of environmental conditions including any combination of temperature, humidity, moisture, wind speed, and wind direction;

calculating the fluid level, the flow rate, and environmental data; and selectively displacing the gate of the at least one irrigation regulation device between an open position and a closed position to control fluid entering the irrigation channel.

* * * * *